US007987835B2

(12) United States Patent
Eisenmenger

(10) Patent No.: US 7,987,835 B2
(45) Date of Patent: Aug. 2, 2011

(54) FUEL INJECTOR

(75) Inventor: Nadja Eisenmenger, Stuttgart (DE)

(73) Assignee: Robert Bosch, GmbH, Stuttgart (DE)

( * ) Notice: Subject to any disclaimer, the term of this patent is extended or adjusted under 35 U.S.C. 154(b) by 0 days.

(21) Appl. No.: 12/434,954

(22) Filed: May 4, 2009

(65) Prior Publication Data

US 2009/0277421 A1 Nov. 12, 2009

(30) Foreign Application Priority Data

May 6, 2008 (DE) ......................... 10 2008 001 597

(51) Int. Cl.
*F02M 59/46* (2006.01)
*F16K 25/00* (2006.01)

(52) U.S. Cl. ............... 123/467; 251/86; 251/88; 239/96

(58) Field of Classification Search .................. 123/467, 123/506; 251/84–88, 129.14, 333, 356; 239/88–96, 239/585.1
See application file for complete search history.

(56) References Cited

U.S. PATENT DOCUMENTS

| | | | | | |
|---|---|---|---|---|---|
| 4,114,851 | A | * | 9/1978 | Shivak et al. | 251/88 |
| 4,235,416 | A | * | 11/1980 | LaCoste et al. | 251/86 |
| 4,501,299 | A | * | 2/1985 | Klimowicz et al. | 137/625.65 |
| 5,279,327 | A | * | 1/1994 | Alsobrooks et al. | 137/510 |
| 5,324,000 | A | * | 6/1994 | Peickert | 251/122 |
| 5,381,816 | A | * | 1/1995 | Alsobrooks et al. | 137/15.22 |
| 6,293,254 | B1 | * | 9/2001 | Crofts et al. | 123/467 |
| 7,650,779 | B2 | * | 1/2010 | Puckett et al. | 73/114.41 |
| 2004/0002810 | A1 | * | 1/2004 | Akuzawa et al. | 701/114 |

FOREIGN PATENT DOCUMENTS

| | | | |
|---|---|---|---|
| DE | 102006050042 | A1 | 4/2008 |
| DE | 102006050812 | A1 | 4/2008 |
| GB | 2341893 | A | 3/2000 |

* cited by examiner

*Primary Examiner* — Thomas N Moulis
(74) *Attorney, Agent, or Firm* — Ronald E. Greigg

(57) ABSTRACT

The invention relates to a fuel injector, in particular a common rail injector, for injecting fuel into a combustion chamber of an internal combustion engine. The fuel injector has an injection valve element which is adjustable between a closing position and an opening position and which is switchable by means of a control valve. The control valve has a sleevelike control valve element that is adjustable along an adjustment axis and in its closing position rests sealingly on a control valve seat element. According to the invention, it is provided that the control valve seat element is disposed movably relative to the adjustment axis of the control valve element.

20 Claims, 4 Drawing Sheets

FUEL INJECTOR

CROSS-REFERENCE TO ELATED APPLICATIONS

This application is based on Germ Patent Application 10 2008 001 597.0 filed May 6, 2008, upon which priority is claimed.

BACKGROUND OF THE INVENTION

1. Field of the Invention

The invention relates to a fuel injector, in particular a common rail injector, for injecting fuel into a combustion chamber of an internal combustion engine.

2. Description of the Prior Art

From European Patent Disclosure EP 1 612 403 A1, a common rail injector is known, having a control valve that is pressure-balanced in the axial direction. By means of the control valve, which has a sleevelike control valve element, the fuel pressure inside a control chamber, defined on the face end by an injection valve element, can be varied. By the variation of the fuel pressure inside the control chamber, the injection valve element is adjusted between an opening position and a closing position, and in its opening position, the injection valve element enables the flow of fuel into the combustion chamber of the engine. The sleevelike control valve element is connected to an armature plate that cooperates with an electromagnetic actuator for axially adjusting the control valve element. For guiding the sleevelike control valve element, a guide extension is provided, which is embodied in one piece with a bottom plate on which a control valve seat, cooperating with the control valve element, is disposed. A disadvantage of the known fuel injector is that the control valve element sealing face that cooperates with the control valve seat must be ground extremely exactly and oriented extremely precisely with the control valve element seat, which makes production complicated and therefore expensive.

OBJECT AND SUMMARY OF THE INVENTION

It is the object of the invention to propose a fuel injector with a sleevelike control valve element, in which the demands for precision of the sealing face and of the control valve element seat are minimized while fill functionality is assured.

The invention is based on the concept of disposing the control valve seat element, which in the prior art is stationary, movably relative to the adjustment axis, which in particular is axial, of the control valve element. As a result, the control valve seat element can orient itself relative to the sleevelike control valve element, and as a result, depending on the degree of freedom of motion of the control valve seat element, any coaxial and/or angular errors that may exist between the control valve seat element and the control valve element can be compensated for. Because of the possibility of automatic orientation of the control valve seat element relative to the adjustment axis of the control valve element, the demands for precision of the sealing face and of the control valve seat are minimized without requiring sacrifices in terms of function. All in all, as a result, an especially robust fuel injector that can be produced economically is obtained.

An embodiment of the control valve or control valve element, embodied preferably as a 2/2-way valve, in which the control valve or control valve element is pressure-balanced in the axial direction in its closing position is especially advantageous. This can be achieved in a sleevelike control valve element in a simple way by providing that the diameter of the sealing line with which the control valve seat element rests on the control valve seat corresponds to the axially spaced-apart, inner guide diameter of the control valve element. This kind of embodiment of the fuel injector is especially suitable for use at rail pressures on the far side of 1800 bar. The attainment of an axial pressure equilibrium therefore makes it possible to use smaller (less-powerful) and in particular electromagnetic actuators and control closing springs. To minimize the danger of bouncing upon closure of the control valve element, an embodiment can also be attained in which the control valve element is pressure-balanced in the axial direction not completely but only approximately. Preferably, a pressure stage acting in the closing direction of the control valve seat element is attained then. To that end, the inner guide diameter of the control valve element should merely be selected as somewhat greater than the diameter of the sealing line.

To compensate for coaxial errors between the control valve element and the control valve seat element, an embodiment is preferred in which the control valve seat element is disposed displaceably relative to the adjustment axis of the control valve element, preferably perpendicular to the adjustment axis of the control valve element. In addition or as an alternative to a displaceable disposition of the control valve seat element relative to the adjustment axis of the control valve element, particularly for compensating for angular errors, an embodiment is preferred in which the control valve seat element is disposed pivotably and/or rollably relative to the adjustment axis, preferably in the manner of a ball joint.

An embodiment of the fuel injector can be obtained in which the control valve seat element is braced, preferably in the axial direction, on a component which is disposed stationary relative to the adjustment axis of the control valve element. As a result, in an especially simple and effective way, a disposition of the control valve seat element that is displaceable relative to the adjustment axis can be achieved. An embodiment in which the control valve seat element is retained on the component solely by the fuel pressure inside the fuel injector, or in other words is acted upon counter to the component by a hydraulic force, is especially advantageous.

Alternatively, an embodiment of the fuel injector is attainable in which the component on which the control valve seat element is braced, preferably in the axial direction, is itself movable relative to the adjustment axis of the control valve element. An embodiment in which the control valve seat element is disposed pivotably to the component that is movable relative to the adjustment axis, and in which the component itself is disposed displaceably relative to the adjustment axis of the control valve element, is especially preferred. Here again, it is advantageous to keep the control valve element on the component solely by fuel pressure. In other words, the described variant embodiment, with two structural elements (control valve element+component) that are movable relative to the adjustment axis of the control valve element, is suitable for attaining an automatic correction of both coaxial and angular errors.

To attain especially great sturdiness of the fuel injector, particularly with regard to particles located in the fuel, an embodiment is preferred in which the control valve seat element has at least one partly spherical portion or is embodied entirely as a ball. In an embodiment in which the control valve seat element has at least one partly spherical portion, the partly spherical portion can be oriented toward the control valve seat, and/or a partly spherical portion can serve to brace the control valve seat on a component that is either stationary relative to the adjustment axis of the control valve element or is movable, preferably displaceable, relative to this adjustment axis.

In terms of the geometric embodiment of the control valve seat on the control valve seat element, various possibilities exist. For instance, the control valve seat can be embodied partially spherically, to which end the control valve seat element is either embodied entirely as a ball or has at least one partly spherical portion that form the control valve seat. Alternatively, an embodiment of the control valve seat element can be attained with an internally conical, in particular internally cone-shaped, control valve seat, or with an externally conical, in particular externally cone-shaped, control valve seat. This kind of conical control valve seat can also be combined with a control valve seat element that has a partly spherical portion, in particular for bracing the control valve seat element on an adjacent component. In another alternative, the control valve seat can be embodied as a flat seat on the control valve seat element; in such an embodiment, in particular for bracing the control valve seat element on a component, especially an axial component, the control valve seat element can have a partly spherical portion as well.

In all the control valve seat element variants described above, the optionally provided partly spherical portion preferably serves to achieve a pivotable disposition of the control valve seat element relative to the adjustment axis.

An embodiment of the control valve in which the control valve element opens downward, that is, in the direction of the injection valve element seat, is especially preferred. Although an embodiment with an upward-opening control valve element is also attainable; nevertheless, with an otherwise typical construction, a correspondingly long outflow conduit must be provided, through which fuel can flow out of the control chamber to the control valve seat.

Especially whenever a guide extension, for attaining internal guidance for the sleevelike control valve element, is embodied on a throttle plate, an embodiment is preferred in which the adjustment axis of the control valve element is aligned axially with the adjustment axis of the injection valve element. An embodiment is also attainable in which the adjustment axis of the control valve element and the adjustment axis of the injection valve element are disposed offset from one another, transversely to the length of the adjustment axes. This kind of embodiment is suitable for minimizing the structural volume of the injector, especially whenever the bottom plate, having the guide extension for guiding the control valve seat, is embodied as a separate component by a throttle plate that has the outlet throttle restriction and/or the inlet throttle restriction for a control chamber.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
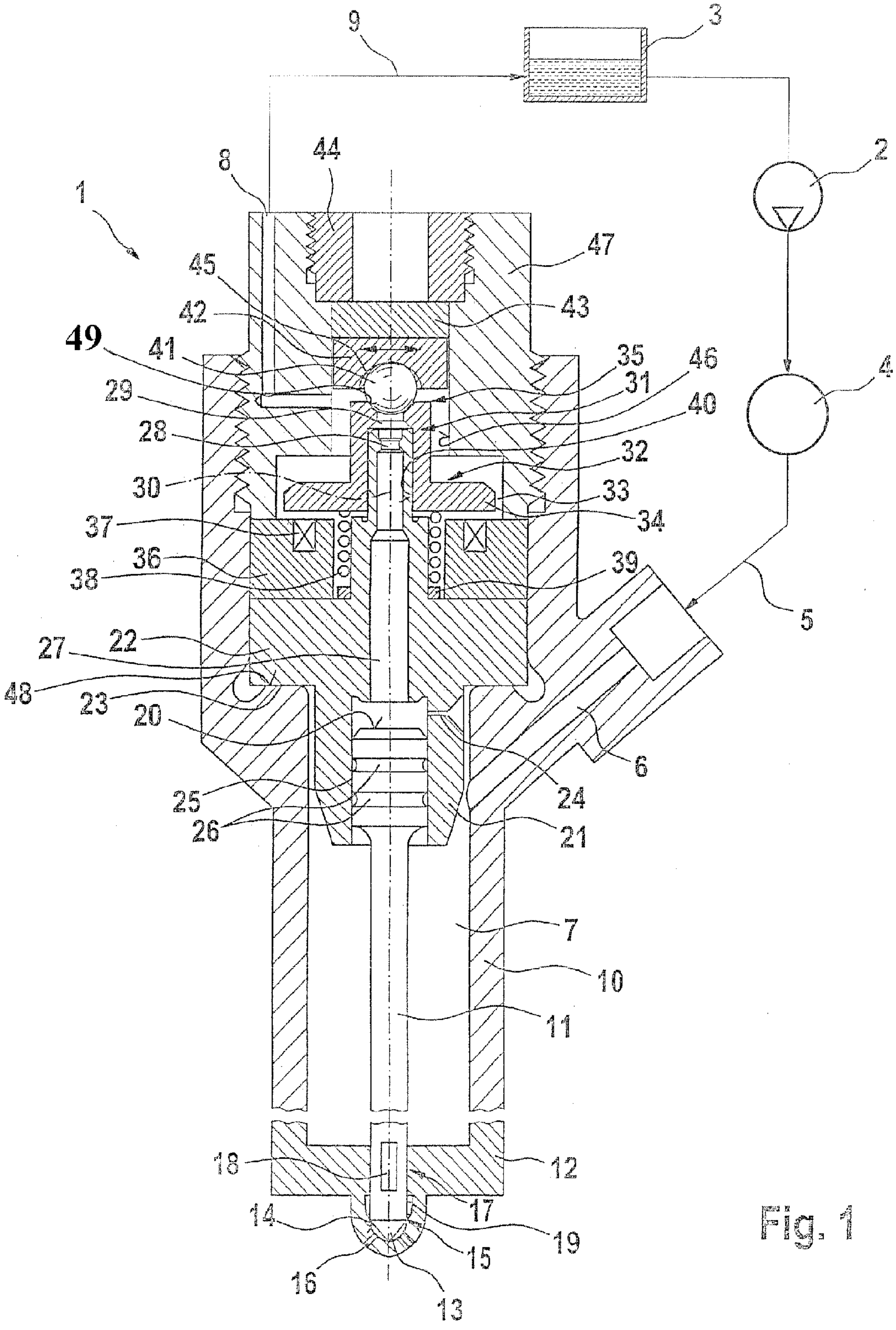
FIG. 1 is a fragmentary, schematic view of a fuel injector with a spherical control valve seat element which is pivotable relative to an adjustment axis of a sleevelike control valve element, and the spherical control valve seat element is braced in the axial direction on a component that is disposed displaceably transversely relative to the adjustment axis.

In the drawings, identical components and components having the same function are identified by the same reference numerals.

In FIG. 1, a fuel injector 1 embodied as a common rail injector is show for injecting fuel into a combustion chamber, not shown, of an internal combustion engine, also not shown, of a motor vehicle. A high-pressure pump 2 supplies fuel from a tank 3 into a high-pressure fuel reservoir 4 (rail). In the rail, fuel, in particular diesel or gasoline, is stored at high pressure, which in this exemplary embodiment is approximately 2000 bar. The fuel injector 1, along with other injectors, not shown, is connected to the high-pressure fuel reservoir 4 via a supply line 5. The supply line 5 discharges into a supply conduit 6, which in turn discharges into a pressure chamber 7 (high-pressure region) of the fuel injector 1. The fuel flowing into the pressure chamber 7 flows directly into the combustion chamber of the engine in an injection event. The fuel injector 1 is connected via an injector return connection 8 to a return line 9. Via the return line 9, a control quantity of fuel to be described hereinafter can flow from the fuel injector 1 to the tank 3 and from there can be supplied to the high-pressure circulatory system again.

Inside an injector body 10, an injection valve element 11, which in this exemplary embodiment is in one piece but which can also be embodied in multiple parts as needed, is adjustable in the axial direction. The injection valve element 11 is guided on its outer circumference inside a nozzle body 12 that is adjacent to the injector body 10. This nozzle body 12, shown in only fragmentary form, is fastened to the injector body 10 by means of a union nut, not shown.

At its tip 13, the injection valve element 11 has a closing face 14 (sealing face), with which the injection valve element 11 can be put into tight contact with an injection valve element seat 15 embodied inside the nozzle body 12. When the injection valve element 11 is resting on its injection valve element seat 15, or in other words is in its closing position, the exit for fuel from a nozzle hole assembly 16 is blocked. Conversely, if it is lifted from its injection valve element seat 15, then fuel from the pressure chamber 7 can flow through axial conduits 18, formed in a guide portion 17 by connections on the outer circumference of the injection valve element 11, into a lower annular chamber 19, in the plane of the drawing, embodied radially between the injection valve element 11 and the nozzle body 12, past the injection valve element 11 to the nozzle hole assembly 16, where it is essentially at high pressure (rail pressure) and can be injected into the combustion chamber.

A control chamber 23 is defined by an upper face end 20 of the injection valve element 11 and a lower sleevelike portion 21, in the plane of the drawing, of a throttle plate 22. The control chamber is supplied with fuel at high pressure from the pressure chamber 7 via an inlet throttle restriction 24, extending radially in the sleevelike portion of the throttle plate 22. The sleevelike portion 21 with the control chamber 23 enclosed in it is surrounded radially outward by fuel at high pressure, so that an annular guide gap 25 radially between the sleevelike portion 21 and the injection valve element 11 is comparatively fuel-tight. To increase the fuel-tightness of the guide gap 25, two annular grooves 26, spaced apart in the axial direction, are provided on the outer circumference of the injection valve element 11, inside the sleevelike portion 21.

The control chamber 23 communicates, via an outflow conduit 27 that has an outlet throttle restriction 28, with a valve chamber 29. The valve chamber 29 is surrounded radially outward by a sleevelike control valve element 31, which is adjustable axially along an adjustment axis 30. The adjustment axis 30 of the control valve element 31 is aligned with an adjustment axis, centrally located in the fuel injector 1, of the injection valve element 11. The sleevelike control valve element 31 is a component of a control valve 32 (servo valve) that is pressure-balanced in the axial direction. From the valve chamber 29, fuel can flow into a low-pressure region 33 of the fuel injector 1 and from there to the injector return connection 8, when the sleevelike control valve element 31, which in the exemplary embodiment shown is embodied in one piece with an armature plate 34, is lifted from its spherical control valve seat 35, or in other words when the control valve 32 is open. For opening the control valve 32, the sleevelike control valve element 31 must be adjusted downward, in the plane of the drawing, in the direction of the injection valve element 11. To that end, an electromagnetic actuator 36 is provided, having an electromagnet 37 (coil): which cooperates with the armature plate 34 and consequently with the control valve element 31, given a suitable supply of electric current. The actuator 36, or more precisely the electromagnet 373 is disposed axially between the armature plate 34 and the throttle plate 22. When current is supplied to the actuator 36, the sleevelike control valve element 31 is adjusted in the axial direction downward in the plane of the drawing along the adjustment axis 30, in the direction of the injection valve element seat 15, and in the process, it lifts from its control valve seat 35. The flow cross sections of the inlet throttle restriction 24 and outlet throttle restriction 28 are adapted to one another such that with the control valve 32 open, the result is a net outflow of fuel (fuel control quantity) from the control chamber 23 via the valve chamber 29 into the low-pressure region 33 of the fuel injector 13 and from there into the tank 3 via the injector return connection 8 and the return line 9. As a result, the pressure of the control chamber 23 drops rapidly, causing the injection valve element 11 to lift from its injection valve element seat 15; as a consequence, fuel from the pressure chamber 7 can flow out into the combustion chamber through the nozzle hole assembly 16.

For terminating the injection event, the current supply to the electromagnetic actuator 36 is interrupted, and as a result the sleevelike control valve element 31 is adjusted upward in the plane of the drawing to its control valve seat 35 by means of a control spring 38, which is braced on the armature plate 34 and on an annular element 39 that rests on the throttle plate 22. The replenishing fuel flowing through the inlet throttle restriction 24 into the control chamber 23 assures a rapid pressure increase in the control chamber 23 and thus a closing force that acts on the injection valve element 11. As a consequence of this force, the injection valve element 11 is moved downward in the plane of the drawing onto the injection valve element seat 15, whereby the injection event is terminated.

A guide extension 40, which protrudes axially upward, is embodied in one piece with the throttle plate 22. The outflow conduit 27 from the control chamber 23 centrally penetrates this guide extension 40) in which the outlet throttle restriction 28 is also disposed. The guide extension 40 extends into the inside of the sleevelike control valve element 31 and serves to guide it upon an adjusting motion along the adjustment axis 30.

The control valve seat 35 is formed by a control valve seat element 41, which in the exemplary embodiment shown is embodied as a ball. The spherical control valve seat element 41 is braced axially on a component 42 which in turn is braced loosely on a plate 43 that in turn rests loosely in the axial direction on a screw insert 44. The component 42 has a dome-shaped portion 45. This portion is embodied as a partially spherical recess, and the partially spherical recess has a radius of curvature greater than the radius of curvature of the spherical control valve seat element 41, in order for orientation purposes to enable the control valve seat element 41 to roll inside the portion 45, or in other words inside the recess, relative to the adjustment axis 30.

The diameter of the plate 43 is approximately equivalent to the diameter of a bore 46 in a valve element 47 into which the screw insert 44 is screwed. As a result, no lateral adjustment of the plate 43 inside the bore 46 is possible. The diameter of the component 42 disposed axially immediately adjacent the plate 43 is made somewhat less than the diameter of the bore 46, so that the component 42 is displaceable, with its dome-like portion 45, relative to the adjustment axis 30, specifically perpendicular to it. The control valve seat element 41 in turn can roll inside the portion 45 of the component 42. Because of the rollable disposition of the control valve seat element 41 relative to the adjustment axis 30 of the control valve element 31, angular errors between the control valve element 31 and the control valve seat element 41 with its control valve seat 35 can thus be compensated for. As a result of the displaceable disposition of the component 42 axially immediately adjacent to the control valve seat element 41 transversely to the adjustment axis 30 along with the control valve seat element 41, coaxial errors between the control valve seat element 41 and the control valve element 31 can additionally be compensated for.

In the embodiment show both the control valve seat element 41 and the component 42 as well as the plate 43 are located loosely (axially adjustably) inside the bore 46 of a valve element 47. In operation, fuel at high pressure located inside the outflow conduit 27 presses the control valve seat element 41 axially upward directly against the component 42; as a result, the component is pressed upward in the plane of the drawing directly against the plate 43, which in turn is acted upon by a counter force from the screw insert 44.

As FIG. 1 shows, the valve element 47 is screwed to the injector body 10 and fastens the actuator 36 against the throttle plate 22, the actuator being braced in the axial direction on an inner annular shoulder 48 of the injector body 10.

A face-end sealing face 49 (annular line), with which the control valve element 31 is braced on the control valve seat element 41, is embodied internally conically, and a sealing line, not shown but formed by the sealing face 49, has at least approximately the same diameter as the guide extension 40, so as to attain a pressure equilibrium of the control valve 32.

Figure 2:
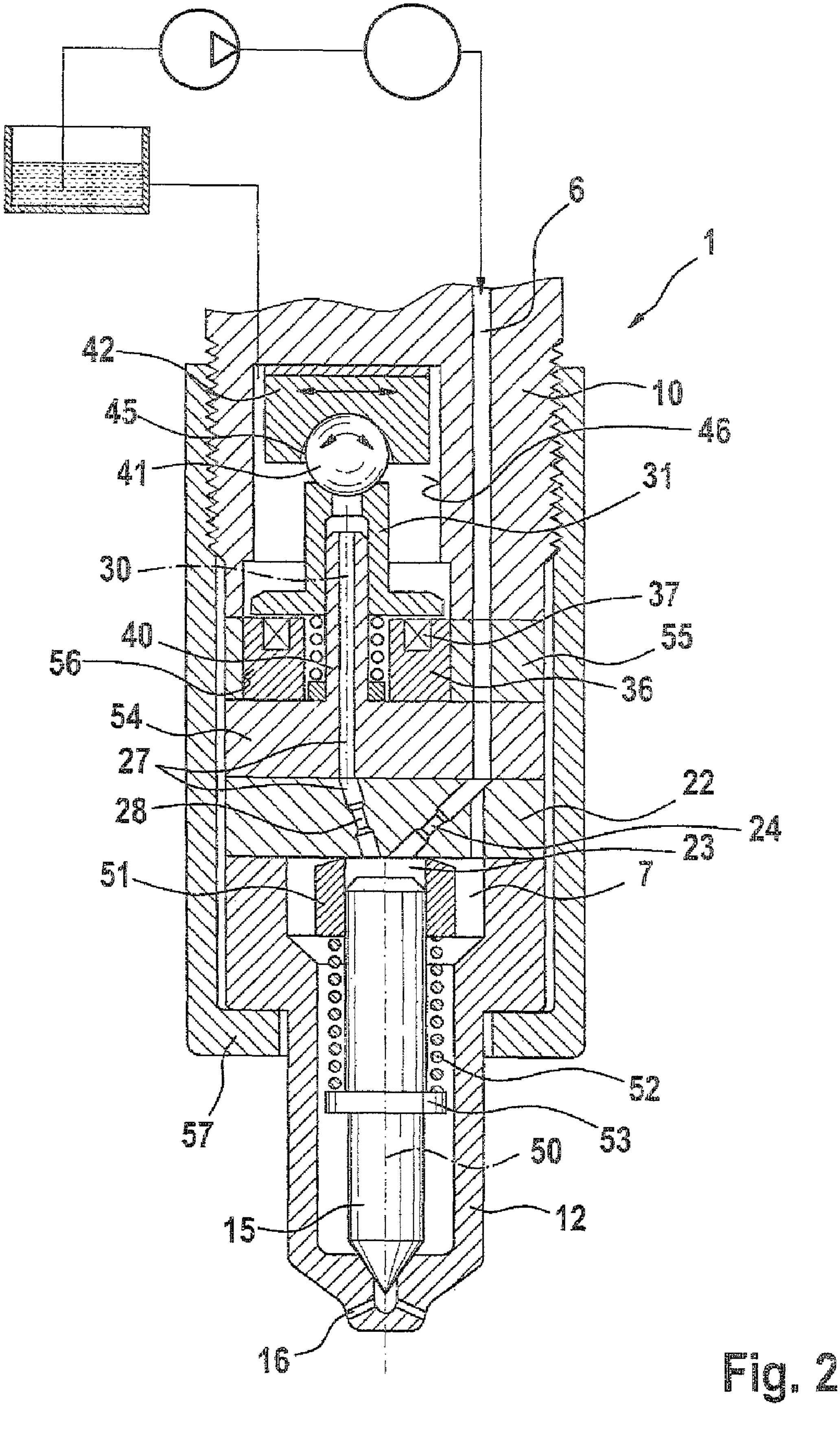
FIG. 2 shows an alternative embodiment of a fuel injector, in which an adjustment axis of the control valve element is disposed offset relative to an adjustment axis of the injection valve element.

In. FIG. 2, an alternative exemplary embodiment of a fuel injector 1 is shown. The mode of operation of the fuel injector 1 of FIG. 2 is essentially equivalent to the mode of operation of the fuel injector 1 of FIG. 1, so that to avoid repetition, essentially only the differences from the fuel injector 1 described above will be discussed hereinafter. For the features they have in common, see the above description of the drawings and FIG. 1 itself.

It can be seen in FIG. 2 that the adjustment axis 30 of the sleevelike control valve element 31 is disposed radially offset from an injection valve element adjustment axis 50. The control chamber 23 disposed in the pressure chamber 7 is defined radially outward by a sleeve component 51, which is braced axially on a throttle plate 22. This throttle plate 22, in addition to the outlet throttle restriction 28, has the inlet throttle restriction 24 for supplying the control chamber 23; the inlet throttle restriction 24 may alternatively also be disposed as a radial conduit in the sleeve component 51. The sleeve component 51 is pressed upward in the plane of the drawing in the axial direction against the throttle plate 22 with the aid of a closing spring 52, and the closing spring 52 is braced in the axial direction on a circumferential collar 53 of the one-piece injection valve element 1. The closing spring 52 reinforces the closing motion of the injection valve element 11.

A bottom plate 54 rests axially directly on the throttle plate 22, and inside the bottom plate, the outflow conduit 27 continues upward in the plane of the drawing. The guide extension 40 is embodied in one piece with the bottom plate 54 and serves to guide the sleevelike control valve element 31 in its axial motion. Alternatively, the bottom plate 54 may also be embodied as a rotationally symmetrical component, in which case the adjustment axis 30 of the control valve element 31 is aligned axially with the injection valve element adjustment axis 50.

Axially bordering the bottom plate 54 directly is a further plate element 55, which in a bore 56 has the actuator 36, laterally offset from the longitudinal center axis of the fuel injector 1, with the electromagnet 37. A nozzle body 12 on the end is screwed by means of a union nut 57 to the injector body 10, and with the aid of the union nut 57, the injector components are fastened against one another. It can also be seen that the supply conduit 6 continues in the axial direction through the injector body 10, the plate element 5, and the bottom plate 54, until it reaches the pressure chamber 7.

As can also be seen from FIG. 2, the control valve element 31 is braced axially from above in the plane of the drawing on a control valve seat element 41 embodied as a ball, which is rollable relative to the adjustment axis 30 inside a domelike portion 45 of an axially adjacent component 42. The component 42 is in turn received displaceably, together with the control valve seat element 41 inside a bore 46 in the injector body 10. The displacement thereof is transverse to the adjustment axis 30 of the control valve element 31.

Various dispositions and embodiments of the control valve seat element 41 and of the components cooperating with it will now be described in conjunction with FIGS. 3 through 7; the embodiments can be attained regardless of the specific structural form of the fuel injector (see for instance FIG. 1 or FIG. 2).

Figure 3:
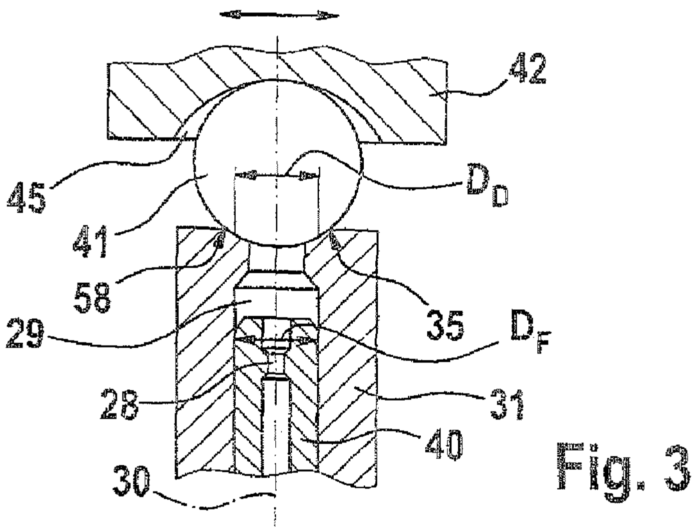
FIG. 3 shows an enlarged view of the embodiment and disposition of a control valve seat element of FIGS. 1 and 2.

In FIG. 3, an enlarged variant is shown of the control valve seat element 41 attained in FIGS. 1 and 2. It is shaped as a ball. It can be seen that the diameter DD of a sealing face (sealing line), embodied on the face end of the control valve seat element 41 is equivalent to the guide diameter DF at which the control valve element 31 is guided on the guide extension 40. It can also be seen that the radius of curvature of the spherical control valve seat element 41 is less than the radius of curvature of the partially spherical recess that forms the domelike portion 45 of the component 42 that is displaceable relative to the adjustment axis 30.

Figure 4:
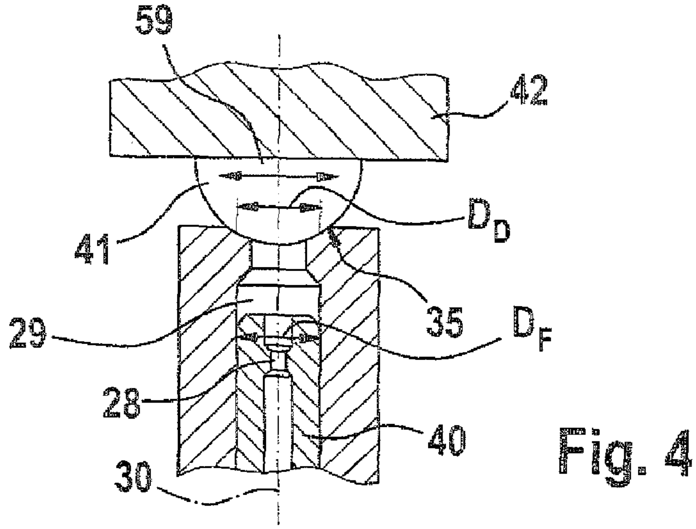
FIG. 4 shows an alternative embodiment of a control valve seat, in which a partially spherical control valve seat element is braced displaceably on a component that is disposed in stationary fashion relative to the adjustment axis of the control valve element.

In FIG. 4, the control valve seat element 41 is embodied at least approximately hemispherically, and the control valve seat element 41 is braced with a flat portion 59 on a component 42 which is disposed stationary relative to the adjustment axis 30. The control valve seat element 41 is disposed displaceably relative to the adjustment axis 30 along the component 42, so that coaxial errors can be compensated for. In the exemplary embodiment shown as well, the diameter DD of the sealing face (sealing line) is equivalent to the guide diameter DF. As can also be seen from FIG. 4, the control valve seat 35 is shaped partially spherically.

Figure 5:
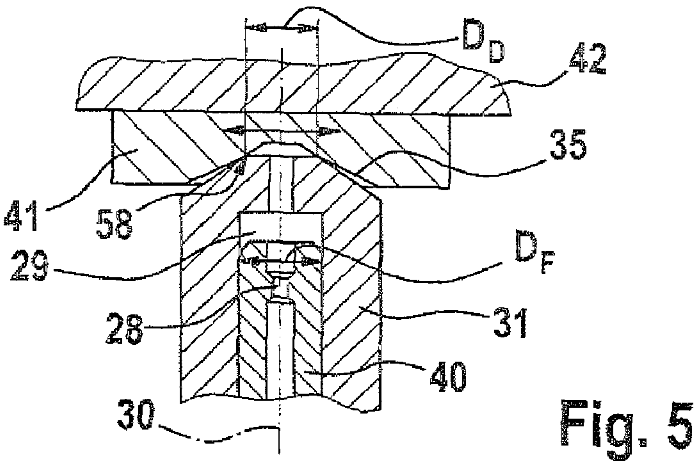
FIG. 5 shows an alternative embodiment of a control valve seat element, displaceable relative to the adjustment axis of the control valve element, with an internally conical control valve seat.
Figure 6:
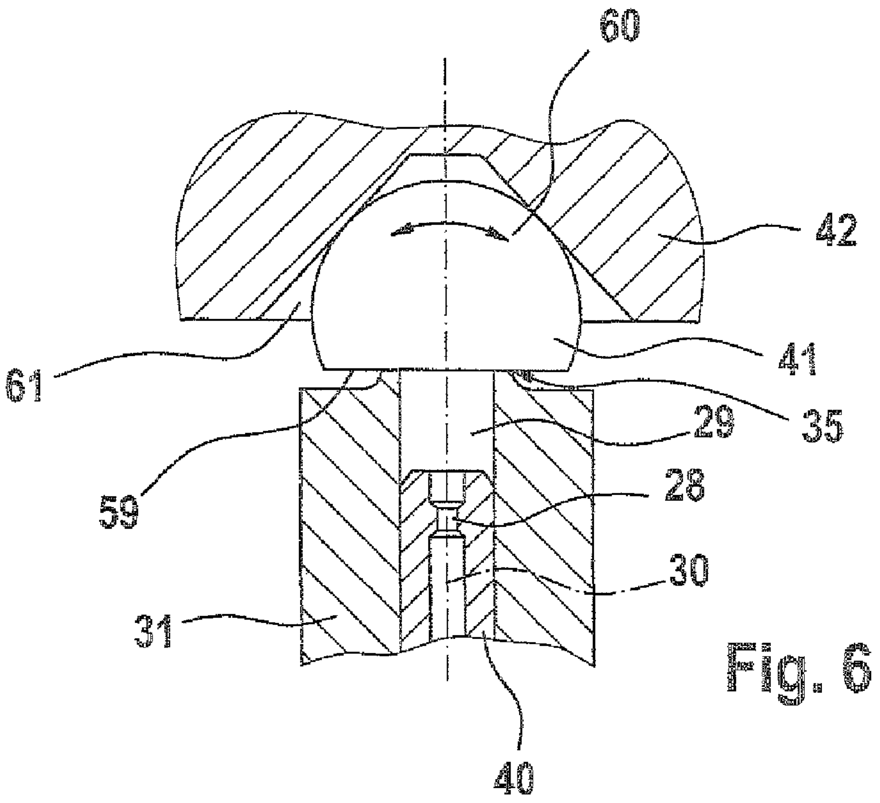
FIG. 6 shows an alternative embodiment of a control valve seat element having a flat seat and a spherical portion for attaining a pivoting motion relative to the adjustment axis of the control valve element.

In FIG. 5, an alternative exemplary embodiment is shown, in which the control valve seat 35 is shaped as an internally cone-shaped female cone. The cone angle of the control valve seat 35 is greater than the cone angle of the cone embodied on the face end of the control valve element 31. As also seen from FIG. 1, the control valve seat element 41 is disposed displaceably transversely to the adjustment axis 30, that is, relative to it, along the component 42, and as a result, coaxial errors can be compensated for.

In FIG. 6, once again a partially spherical, at least approximately hemispherical control valve seat element 41 is provided; in the exemplary embodiment shown, a flat portion 59 of the control valve seat element 41 forms the control valve seat 35, which is embodied as a flat seat. With a partly spherical portion 60, the control valve seat element 41 is received in an internally conical recess 61 of the component 42. With the variant embodiment shown, only angular errors can be corrected, in the event that the component 42 is disposed as stationary relative to the adjustment axis 30. In the event that the component 42 is disposed displaceably relative to the adjustment axis 30, then in addition coaxial errors of the control valve element 31 relative to the control valve seat 35 embodied as a flat seat can be compensated for.

Figure 7:
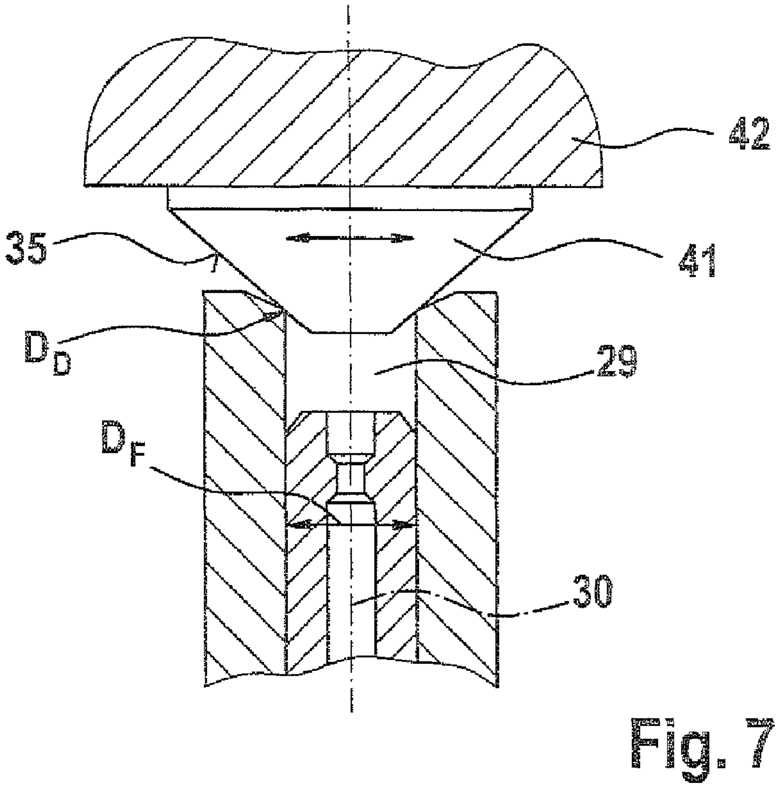
FIG. 7 shows an alternative embodiment of a control valve seat element with an externally conical control valve seat.

In the exemplary embodiment of FIG. 7, the control valve seat element 41 that is adjustable transversely to the adjustment axis 30 has a control valve seat 35 embodied as a male cone. Once again, the diameter DD of the annular sealing face (sealing line) is at least approximately equivalent to the guide diameter DF, so that a control valve that is pressure-balanced in the axial direction is obtained.

The foregoing relates to preferred exemplary embodiment of the invention, it being understood that other variants and embodiments thereof are possible within the spirit and scope of the invention, the latter being defined by the appended claims.

I claim:

1. A fuel injector, in particular a common rail injector, for injecting fuel into a combustion chamber of an internal combustion engine, comprising:

an injection valve element which is adjustable between a closing position and an opening position; and a control valve switching the injection valve element between the closing position and the opening position, the control valve having a sleeve-like control valve element and a valve seat element, the sleeve-like control valve element being adjustable axially along an adjustment axis between a closing position and an open position, the sleeve-like control valve element in its closing position resting sealingly on the control valve seat element, the sleeve-like control valve element being adjustable axially along the adjustment axis in a direction of the injection valve element to lift the sleeve-like control valve element from its closing position in sealing engagement with the control valve seat element and in the process causing the injection valve element to lift from its closing position so that fuel is injected into the combustion chamber of the internal combustion engine, and wherein the control valve seat element is disposed movably relative to the adjustment axis of the control valve element to compensate for coaxial errors between the sleeve-like control valve element and the control valve seat element.

2. The fuel injector as defined by claim 1, wherein the sleeve-like control valve element, in its closing position, is at least approximately pressure-balanced in an axial direction.

3. The fuel injector as defined by claim 1, wherein the control valve seat element is disposed displaceably transversely to the adjustment axis.

4. The fuel injector as defined by claim 1, wherein the control valve seat element is disposed pivotably and/or rollably relative to the adjustment axis in the manner of a ball joint.

5. The fuel injector as defined by claim 1, wherein the control valve seat element is braced on a component that is stationary relative to the adjustment axis, and the control valve seat element is displaceable relative to the component.

6. The fuel injector as defined by claim 2, wherein the control valve seat element is braced on a component that is stationary relative to the adjustment axis, and the control valve seat element is displaceable relative to the component.

7. The fuel injector as defined by claim 3, wherein the control valve seat element is braced on a component that is stationary relative to the adjustment axis, and the control valve seat element is displaceable relative to the component.

8. The fuel injector as defined by claim 1, wherein the control valve seat element is braced on a component that is displaceable relative to the adjustment axis, and the control valve seat element is pivotable and/or rollable relative to this component.

9. The fuel injector as defined by claim 2, wherein the control valve seat element is braced on a component that is displaceable relative to the adjustment axis, and the control valve seat element is pivotable and/or rollable relative to this component.

10. The fuel injector as defined by claim 3, wherein the control valve seat element is braced on a component that is displaceable relative to the adjustment axis, and the control valve seat element is pivotable and/or rollable relative to this component.

11. The fuel injector as defined by claim 1, wherein the control valve seat element has at least one partially spherical portion or is embodied as a ball.

12. The fuel injector as defined by claim 2, wherein the control valve seat element has at least one partially spherical portion or is embodied as a ball.

13. The fuel injector as defined by claim 3, wherein the control valve seat element has at least one partially spherical portion or is embodied as a ball.

14. The fuel injector as defined by claim 4, wherein the control valve seat element has at least one partially spherical portion or is embodied as a ball.

15. The fuel injector as defined by claim 5, wherein the control valve seat element has at least one partially spherical portion or is embodied as a ball.

16. The fuel injector as defined by claim 1, wherein the control valve seat element has a partially spherical or an internally conical control valve seat, or an externally conical control valve seat, or a control valve seat embodied as a flat seat.

17. The fuel injector as defined by claim 2, wherein the control valve seat element has a partially spherical or an internally conical control valve seat, or an externally conical control valve seat, or a control valve seat embodied as a flat seat.

18. The fuel injector as defined by claim 1, wherein the adjustment axis of the control valve element is disposed offset laterally from an axis of motion of the injection valve element.

19. The fuel injector as defined by claim 1, wherein an outlet throttle restriction and/or an inlet throttle restriction associated with a control chamber is disposed in a throttle plate which is embodied as a component that is separate from a guide rod portion for a bottom plate that has the sleeve-like control valve element.

20. The fuel injector as defined by claim 1, wherein the sleeve-like control valve element is adjusted axially along the adjustment axis in the direction of the injection valve element by an electromagnetic actuator.

* * * * *